March 22, 1960   J. W. HUDSON   2,929,529
TERRAZZO HOLDER FOR UNDER-FLOOR JUNCTION BOX
Filed Jan. 26, 1956   3 Sheets-Sheet 1
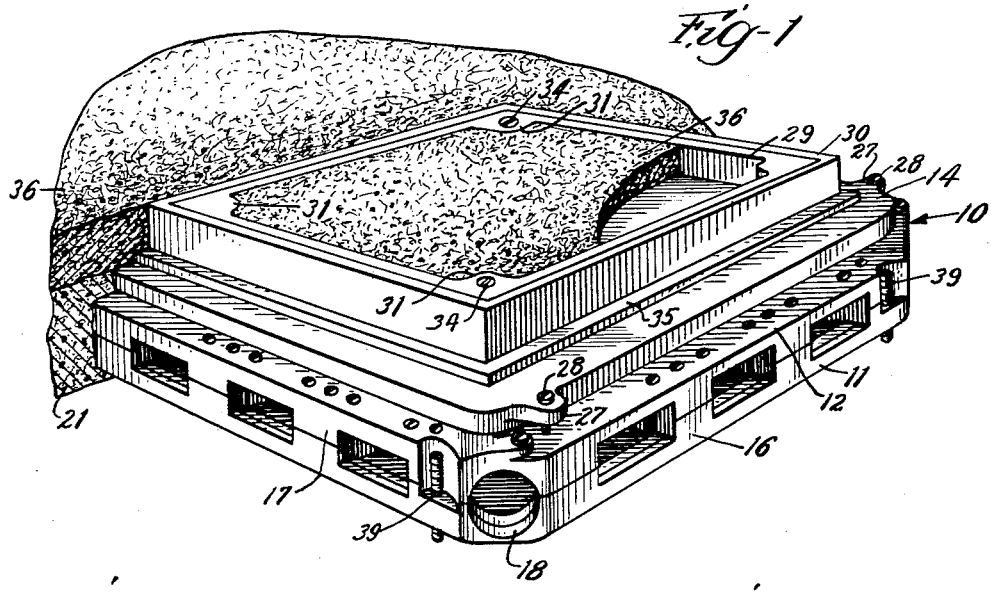
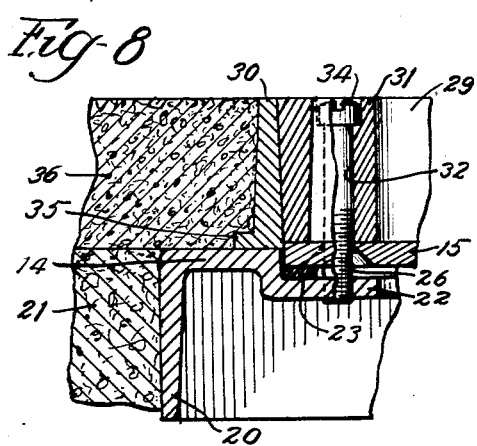
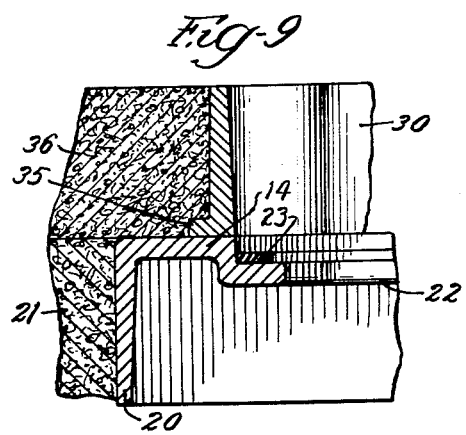
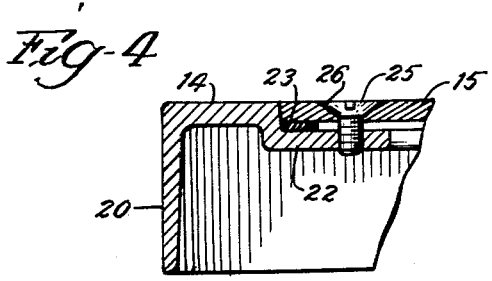
INVENTOR.
James W. Hudson
BY
Cromwell, Greist + Warden
Attys.

March 22, 1960   J. W. HUDSON   2,929,529
TERRAZZO HOLDER FOR UNDER-FLOOR JUNCTION BOX
Filed Jan. 26, 1956   3 Sheets-Sheet 2
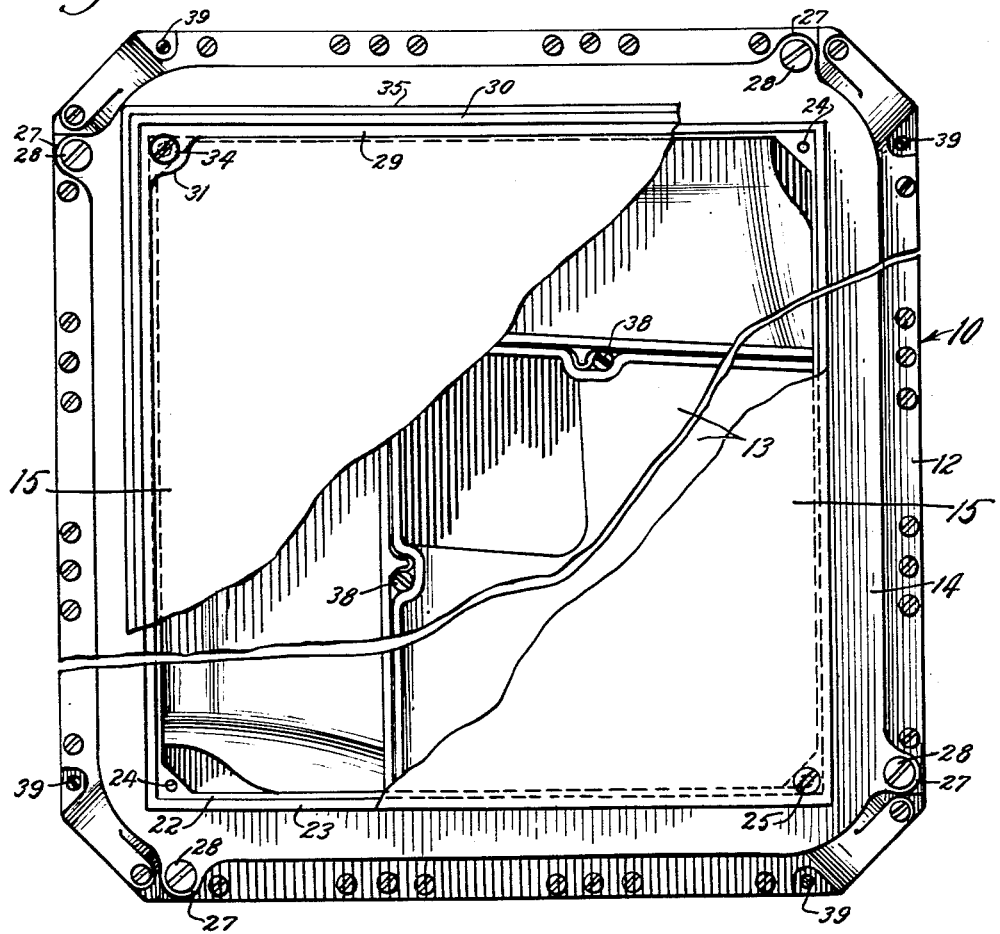
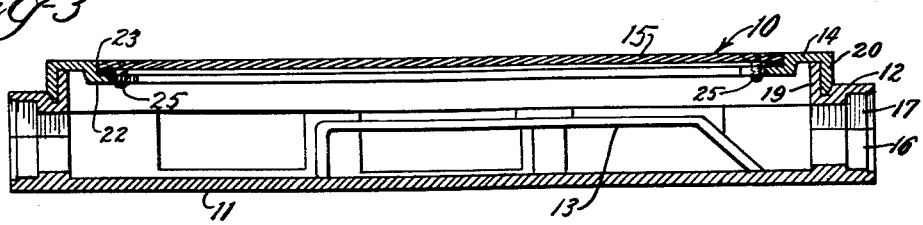
INVENTOR.
James W. Hudson
BY
Cromwell, Greist & Warden
Attys.

March 22, 1960   J. W. HUDSON   2,929,529
TERRAZZO HOLDER FOR UNDER-FLOOR JUNCTION BOX
Filed Jan. 26, 1956   3 Sheets-Sheet 3
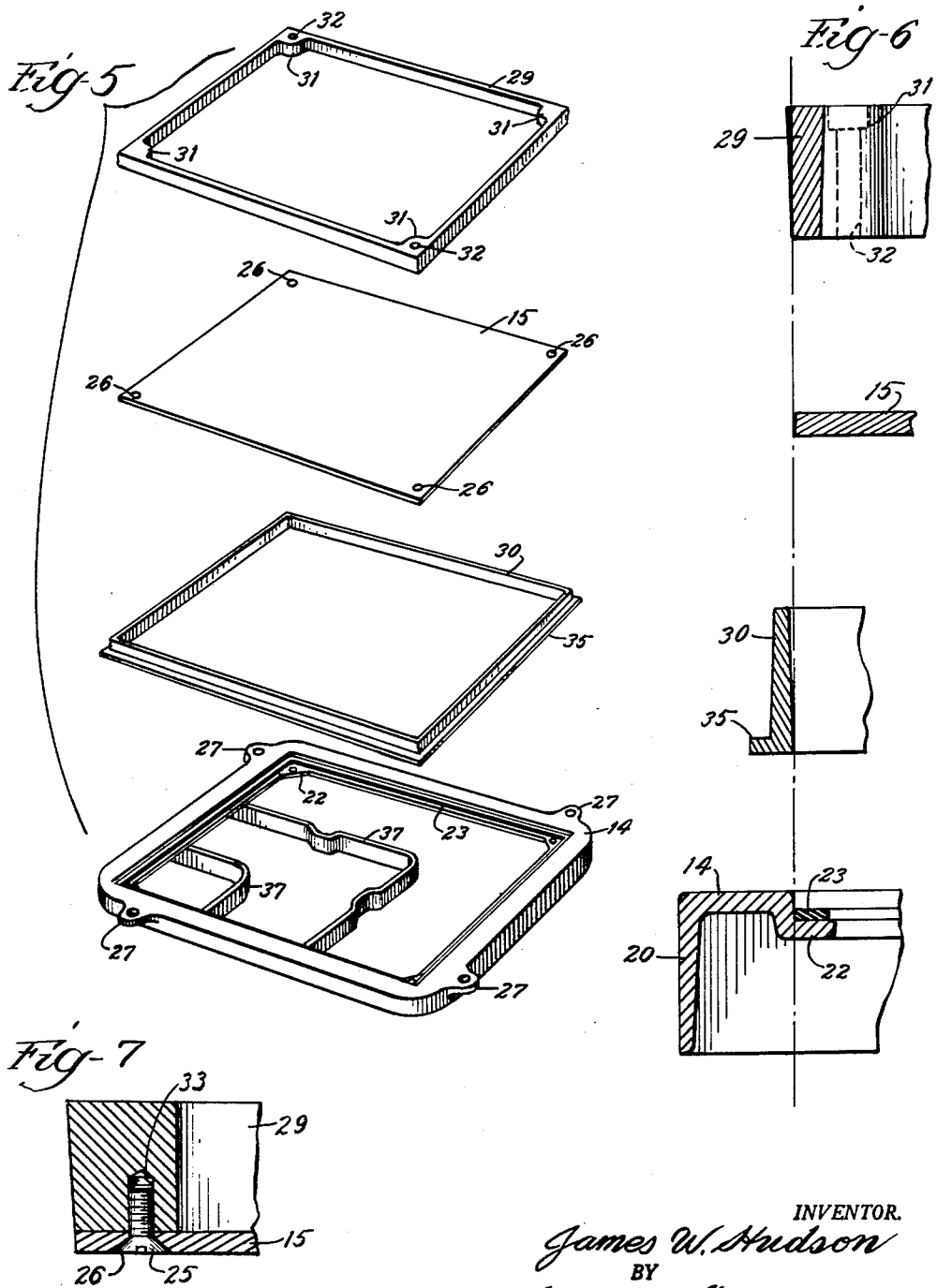
INVENTOR.
James W. Hudson
BY
Cromwell, Greist & Warden United States Patent Office
2,929,529
Patented Mar. 22, 1960

2,929,529

TERRAZZO HOLDER FOR UNDER-FLOOR JUNCTION BOX

James W. Hudson, Elmhurst, Ill., assignor, by mesne assignments, to The National Supply Company, a corporation of Ohio Application January 26, 1956, Serial No. 561,422

3 Claims. (Cl. 220—3.4)

The present invention relates generally to an improved composition flooring material holder for use with an underfloor wire distribution system junction box.

It is an object of the present invention to provide a simplified form of terrazzo or other composition flooring material holder of the type which may be readily mounted on a junction box of an underfloor wire distribution system, which box is provided with a top plate or an equivalent means which may be used in combination with the holder of the present invention to form a tray-like receptacle opening upwardly from the top of the junction box and being adapted to receive composition flooring material such as terrazzo therein.

Another object is to provide a simplified flooring material holding arrangement which may be readily mounted on a junction box which has been substantially buried in subflooring material and which arrangement makes use of the top cover plate which forms a part of the junction box to provide a cup-like portion adapted for receiving flooring material, which portion may be readily disassociated from the junction box when it is desired to gain access thereinto.

Still another object is to provide a recessed terrazzo holder of even terrazzo depth from wall to wall, corner to corner, the terrazzo carried thereby having uniform thickness and the terrazzo mounting portion of the holder being readily removable from association with the junction box without damage being done to the terrazzo contained therein, the removal of the terrazzo mounting portion thereby allowing access to the interior of the junction box for servicing, the terrazzo mounting portion being readily adapted for reassembly with the junction box following the servicing thereof without the necessity of repair to the floor surface.

Other objects not specifically set forth will become apparent from the following detailed description made in conjunction with the drawings wherein:

Fig. 1 is a fragmentary perspective view of an assembled junction box and flooring material holder in cooperation with surrounding flooring material to illustrate the manner in which the assembled unit is used in a building construction, the flooring material contained within the flooring holder being partially removed to better illustrate the structural details thereof;

Fig. 2 is a top plan composite view of fragmentary portions of junction boxes, the upper portion illustrating a junction box provided with a flooring material holder of the present invention and the lower portion illustrating a junction box as normally used without having a flooring material holder associated therewith;

Fig. 3 is a vertical section of a junction box illustrating the relationship existing between the various elements thereof prior to the mounting of a flooring material holder of the present invention thereto;

Fig. 4 is an enlarged fragmentary sectional view of the associated elements of a junction box illustrating the manner in which the top cover member is attached thereto when the flooring material holder of the present invention is not associated therewith;

Fig. 5 is an exploded perspective view of the elements of the flooring material holder and the elements of the junction box to which the same is mounted;

Fig. 6 is a series of enlarged fragmentary vertical sections of the elements illustrated in Fig. 5 aligned by the vertical broken line to illustrate the assembly relation of the same;

Fig. 7 is an enlarged fragmentary vertical section illustrating the manner in which the top cover member of a junction box is mounted with an element of the flooring material holder of the present invention;

Fig. 8 is an enlarged fragmentary vertical section of a corner construction illustrating the mounting of the flooring material holder with certain elements of a junction box and further illustrating the relation between the surrounding flooring material and the aforesaid elements; and Fig. 9 is a view similar to Fig. 8 illustrating the relation of the remaining element of the flooring material holder and junction box following the removal of the main portion of the flooring material holder for the purpose of gaining access to the interior of the junction box.

For purposes of illustration the flooring material holder of the present invention in the form shown in the drawings is particularly adapted for use with the type of junction box disclosed in my copending application, Serial No. 537,265, filed September 28, 1955, and now abandoned. Sufficient details of the junction box of my copending application are shown in the drawings and will be described in order to fully illustrate the manner in which the material holder of the present invention is utilized. However, it should be understood that other forms of junction boxes are also adapted for use with a flooring material holder incorporating the principles of that to be described and that it is not intended by limiting the description to the forms of flooring material holder and junction box shown in the accompanying drawings to limit the scope of the invention to the particular configurations of the various elements about to be described. Consequently, it should be apparent from the following detailed description that the mounting principles incorporated in the form of flooring material holder disclosed may be incorporated in many different shapes of flooring material holders and it is thereby intended that the scope of the present invention shall encompass these various shapes.

The form of junction box 10 shown in Figs. 1–3 consists generally of a base member 11, cover member 12, partition member 13, ring member 14 and top plate member 15. The base member 11 is of a square outline and is formed with a flat bottom plate which is provided about the outer periphery thereof with upstanding integral posts 16. The cover member 12 is a ring-like member of square outline which is formed with a radially extending flange having downwardly projecting posts 17. The posts 16 and 17 abut with one anotheer to define therebetween duct receiving apertures. The type of duct used with the junction box disclosed is not shown in the drawings but the particular interconnecting features of these elements are fully disclosed in my copending application. The partition member 13 is of any suitable design to subdivide the interior of the junction box into separated passageways for segregation of wiring fed therethrough.

The corners of the cooperating base member 11 and cover member 12 are truncated or flattened and define conduit receiving openings 18 for wiring purposes familiar to those skilled in the art. Suitable fastening means connect the base member 11 and cover member 12 to form the body portion of the junction box 10. The cover member 12 is provided with an upwardly directed flange 19 which receives thereabout a downwardly directed flange 20 of the ring member 14. As fully described in my copending application, the telescoping flanges 19 and 20 cooperate with one another to allow vertical adjustment of the ring member 14 with respect to the body portion of the junction box 10. In this manner the top surface of the junction box 10 may be aligned with the top surface of the subflooring 21 in normal installation.

The central portion of the ring member 14 is recessed to define an inwardly directed flange 22 which carries thereon a gasket seal 23 for sealing with the top plate 15. The corners of the flange 22 are provided with tapped holes 24 which receive screws 25 threadedly therein to attach the cover plate 15 to the ring member 14. As illustrated in Fig. 4, apertures 26 in the top plate 15 are countersunk to receive the heads of the screws 25 thereby providing the junction box 10 with a flat top surface. In Fig. 4 the manner of mounting the cover plate 15 with the ring member 14 is clearly shown.

Referring again to the ring member 14 it will be noted in Figs. 1 and 2 that the outer periphery of the ring member 14 is provided with outwardly directed screw receiving portions 27 carrying screws 28 therein. The screws 28 are load-bearing screws and are received in tapped holes in the cover member 12 to attach the ring member 14 thereto. The height of the ring member 14 and its associated cover plate 15 may be adjusted by advancing or retracting the screws 28 as fully described in my copending application.

As shown in Fig. 3 and the lower portion of the composite view of Fig. 2, the junction box 10 when not associated with the flooring material holder of the present invention presents a flat top surface as defined by the ring member 14 and cover plate 15 which is normally aligned with the top surface of the subflooring 21. When it is desired to lay top flooring material such as linoleum or tile the material is directly applied over the top cover plate 15 and in order to gain access to the interior of the junction box for servicing it is necessary merely to remove the top flooring material fro mthe top surface of the cover plate 15, remove the screws 25 and the cover plate 15 and the interior of the junction box 10 is thereby exposed. In the instance where composition material such as terrazzo is used to form the top flooring material it is of course desirable to confine the portion of composition material directly above the cover plate 15 in such a manner that it may be removed intact so as to gain access into the interior of the junction box without the necessity of repairing the composition material directly above the same. The terrazzo holder of the present invention is particularly adapted for this purpose and is shown in its assembly with the junction box 10 in Fig. 1 and the upper portion of the composite view of Fig. 2.

Referring to the structural elements of the flooring material holder of the present invention, Figs. 5–9 will now be considered. The additional elements necessary to form the flooring material holder include a pair of concentric rings 29 and 30. The innermost ring is provided with enlarged inwardly directed corners 31, two of which, being diametrically opposed, are provided with drilled holes 32. The holes 32 extend completely through the enlarged corners 31 for a purpose to be subsequently described.

The remaining pair of diametrically opposed enlarged corner portions 31 are provided with tapped holes 33 which extend upwardly from the bottom surface thereof as illustrated in Fig. 7. While the tapped holes 33 are not shown as extending completely through the enlarged portions 31 carrying them, it should be understood that these holes may extend completely therethrough if such is desired.

The ring 29 is adapted for association with the cover plate 15 and this association is brought about in the manner as shown in Fig. 7. The screws 25 normally used in attaching the cover plate 15 to the ring member 14 are adapted for being threadedly received by the tapped holes 33 to attach the cover plate 15 to the bottom surface of the innermost ring 29. To bring this about the cover plate 15 is preferably inverted and the screws 25 in their normal relation with the cover plate 15 are thereby directed upwardly so as to allow them to be threadedly received in the threaded apertures 33. In this manner the innermost ring 29 is provided with a bottom member to thereby define a cup-like or tray-like receptacle having a bottom member and vertically extending side walls of an integral form. The outer diameter of the innermost ring 29 is substantially equal to the outer diameter of the cover plate 15 and when the combined elements are re-associated with the ring member 14 the cover plate 15 is still received in sealing engagement with the sealing gasket 23 carried by the flange 22 of the ring member 14.

In order to attach the receptacle formed by the ring member 29 and the cover plate 15, the apertures 32 are adapted to receive fastening means inserted downwardly therethrough from the top surface of the ring 29 and the remaining diametrically opposed apertures 26 of the cover plate 15 being aligned with the apertures 32 allow the fastening means to be threadedly received by the aligned tapped holes carried by the flange 22 of the ring member 14. The manner in which the mounting of the combined ring 29 and cover plate 15 is brought about with respect to the ring member 14 is clearly shown in Fig. 8. Each of the corners 31 of the ring 29 which carry the apertures 32 are aligned with diametrically opposed tapped holes in the corners of the flange 22 of the ring member 14. Fastening means such as a threaded bolt 34 is passed downwardly through the drilled hole 32, drilled hole 26 of the cover plate 15 and into threaded engagement with a tapped hole carried by the flange 22 of the ring member 14. The upper end of the drilled hole 32 is countersunk to receive the head of the bolt 34 therein to thereby maintain a flat top surface with respect to the ring member 29.

As a result of the above described arrangement both the top and bottom surfaces of the tray-like receptacle formed by combining the ring 29 with the cover plate 15 are flat and the sealing gasket 23 provides efficient sealing action throughout the entire periphery of the flange 22 and the associated portions of the cover plate 15. The cover plate 15 is properly attached to the innermost ring 29 at opposite corners thereof by fastening means 25 and the assembled receptacle is efficiently fastened to the ring member 14 at opposite corners thereof by use of the fastening means 34 extending through both the innermost ring 29 and the cover plate 15. It will be noted that the fastening means 34 are accessible from the top surface of the receptacle and the receptacle may be readily attached to the junction box 10 or disassociated therefrom by removing the fastening means 34 from engagement with the flange 22. To bring this about the fastening means 34 may be readily reached from the top surface of the floor.

The outermost ring 30 telescopically receives the innermost ring 29 and is provided with an outwardly directed flange 35 at the bottom portion thereof which is engaged by flooring material 36, such as terrazzo, which is poured on top of the subflooring 21 about the flooring material holder and against the top surface of the junction box 10. The outer ring 30 provides a lining means for the innermost ring 29 and its associated cover plate 15 to maintain separation between surrounding flooring material and the flooring materal holder. As a result of this separation the innermost positioned receptacle defined by the innermost ring 29 and the cover plate 15 may be detached from connection with the junction box 10 and removed intact for the purpose of gaining access into the interior of the junction box 10. The terrazzo material carried within the receptacle is maintained intact and the surrounding terrazzo material is not destroyed or damaged to an extent that repair is necessary following servicing of the interior of the junction box.

In Fig. 9, the arrangement existing between the outermost ring 30 and the ring member 14 upon removal of the terrazzo holder is shown and it will be noted that the outermost ring 30 merely rests on the top surface of the ring member 14 and is held in place by the cooperation of the surrounding flooring material 36 with the outwardly directed flange 35. The inner diameter of the outermost ring 30 is slightly greater than the outer diameter of the combined innermost ring 29 and cover plate 15 to allow ready withdrawal of the receptacle upwardly out of contact therewith and out of association with the junction box 10. Furthermore, as clearly shown in Fig. 6, the inner and outer surfaces of the rings 30 and 29 respectively taper outwardly in an upwardly direction. The vertical broken line of Fig. 6 illustrates the extent of taper with respect to a vertical line of contact. As a result, the receptacle may be readily withdrawn from within the ring 30. The full interior of the junction box is then made accessible and following servicing of the same the receptacle may be readily reinserted within the ring 30 and the fastening means 34 threadedly advanced into contact with the tapped holes carried by the flange 22 of the ring member 14.

The withdrawing of the receptacle from within the ring 30 in order to expose the interior of the junction box may be readily accomplished in any known manner. As previously described, the fastening means 34 are withdrawn and the drilled holes 32 are thus exposed into which a lifting element such as a screw driver may be inserted and angularly related thereto to become wedged within the holes and provide sufficient gripping action to lift the fully complemented receptacle out of association with the ring 30. Still further, as described in my copending application, Serial No. 537,265, the drilled holes 26 of the cover plate 15 may be suitably threaded to engagingly receive screws of a larger size than the fastening means 34. Thus, the screws 34 will readily pass through the tapped openings 26 for the purpose previously described and, upon the removal of the screws 34, larger sized screws can be threadedly advanced into engagement with the cover plate 15 and used to lift the same out of the ring 30.

From the foregoing description it will be apparent that the flooring material holder of the present invention is simplified in design. In effect, the only elements necessary to provide a fully efficient flooring material holder are a pair of concentric rings provided with apertures adapted to receive fastening means of the type described. The cover plate 15 of the junction box 10 is used in conjunction with the innermost ring 29 without the necessity of varying its structural features and due to the relative simplicity of the holder elements, the cover plate 15 is provided with a dual function. While it has been described as being preferable to invert the cover plate 15 so that a flat bottom surface is provided which will not interfere with the sealing function of the gasket 23, it should be understood that the particular arrangement described is not necessary as long as a proper sealing effect is maintained. The holder assembly including the rings 29 and 30 may be readily assembled to the junction box 10 on the site of installation of the same and it will be noted with particular importance that the structural features of the junction box 10 are not required to be changed to any extent in order to have the flooring material holder attached thereto. The leveling screws 28 still function in the same manner and the ring member 14 may be raised or lowered with respect to the cover member 12 even though the flooring material holder is mounted thereon.

As fully described in my copending application the cover plate 15 is centrally supported by reinforcing members 37 which extend in the form of webs interiorly of the ring member 14. The partition member 13 is further provided with load-bearing screws 38 further aiding in providing load-bearing support to the central portion of the cover plate 15. The load-bearing functions of the last mentioned elements are retained by the flooring material holder arrangement and no adverse effect to the full and efficient functioning of the cover plate in connection with the junction box 10 accompanies the dual use thereof.

In briefly reviewing the use of the structural arrangements above described, the junction box 10 is placed on a structural base and leveled with respect thereto by manipulation of leveling screws 39, as shown in Fig. 1, following which the subflooring 21, which is normally concrete, is poured to surround the junction box and its associated wire carrying ducts and conduits. The top surface of the junction box 10, as defined by the top surface of the cover plate 15, is maintained at a level by manipulation of the load-bearing screws 28 that coincides with the top surface of the subflooring material 21. Following the pouring and setting up of the subflooring 21 the top plate 15 is removed and inverted and two diametrically positioned screws 25 are passed upwardly into threaded engagement with the oppositely spaced tapped holes 33 of the innermost ring 29. The outermost ring 30 is then placed in resting engagement with the top surface of the ring member 14. The flooring composition receiving receptacle previously formed is then placed within the ring 30 and attached to the ring member 14 by the use of oppositely positioned bolts 34 which pass downwardly from the top surface of the ring 29. The composition top flooring material 36, such as terrazzo, is poured and quantities thereof fill the receptacle. The top surfaces of the concentric rings 29 and 30 are maintained in coinciding relation with the top surface of the poured flooring material and a smooth, even flow results. The countersinking of the drilled holes 32 allows the fastening means 34 to be moved sufficiently downwardly so as not to protrude above the top surface of the finished floor. However, the fastening means 34 are still accessible from the top surface of the floor and may be readily removed to allow removal of the terrazzo containing receptacle from within the outer ring 30 thereby gaining access into the interior of the junction box 10 for servicing.

Obviously many modifications and variations of the invention as hereinbefore set forth may be made without departing from the spirit and scope thereof, and therefore only such limitations should be imposed as are indicated in the appended claims.

I claim:

1. In combination, an underfloor wire distribution system junction box comprising a body portion and a removable top cover member, said cover member being provided with attaching apertures, and a flooring material holder comprising concentric ring-like members associated with said junction box, the innermost ring-like member being provided with apertures extending upwardly from the bottom surface thereof and aligned with some of the cover member apertures, fastening means extending through said aligned apertures and attaching said cover member with the bottom surface of said innermost ring-like member thereby defining a receptacle for receiving flooring material, said innermost ring-like member being provided with additional apertures extending therethrough in a substantially vertical direction, said additional apertures being aligned with the remaining apertures of said cover member, and additional fastening means received in said additional apertures and extending through said innermost ring-like member and said cover member to attach the receptacle formed thereby to said body portion, said additional fastening means being accessible from the top surface of said innermost ring-like member, the outermost ring-like member being adapted to maintain separation between the outer surfaces of said innermost ring-like member and surrounding floor material.

2. In combination, an underfloor wire distribution system junction box comprising a body portion and a removable top cover member, said cover member being provided with attaching apertures, and a flooring material holder comprising concentric ring-like members associated with said junction box, the innermost ring-like member being provided with apertures extending upwardly from the bottom surface thereof and aligned with some of the cover member apertures, fastening means extending through said aligned apertures and attaching said cover member with the bottom surface of said innermost ring-like member thereby defining a receptacle for receiving flooring material, said innermost ring-like member being provided with additional apertures extending therethrough in a substantially vertical direction, said additional apertures being aligned with the remaining apertures of said cover member, and additional fastening means received in said additional apertures and extending through said innermost ring-like member and said cover member to attach the receptacle formed thereby to said body portion, said additional fastening means being accessible from the top surface of said innermost ring-like member, the outermost ring-like member being adapted to maintain separation between the outer surface of said innermost ring-like member and surrounding flooring material and being provided with means for retaining said outermost ring-like member in substantially fixed relation with surrounding flooring material.

3. In combination, a flooring material holder attached to an underfloor wire distribution system junction box provided with a body portion and a top cover plate, said holder including a pair of concentric ring members, the innermost of said ring members being centrally unobstructed and separate from said cover plate while being attached thereto with said cover plate in abutment with the bottom surface of said innermost ring member, the outermost of said ring members being co-extensive with the outer surface of said innermost ring member and having larger inner dimensions to permit ready withdrawal of said innermost ring member and said cover plate therethrough to expose the interior of said junction box, first fastening means carried by said innermost ring member removably attaching said cover plate thereto, second fastening means carried by said innermost ring member and extending therethrough and through said cover plate and removably attaching said innermost ring member and said cover plate to the body portion of said junction box, said second fastening means being accessible from the top of said material holder to permit ready detachment of the interconnected innermost ring member and cover plate from the body portion of said junction box for withdrawal thereof through said outermost ring member, said outermost ring member being provided along the outer surface thereof with position fixing means for embedding in flooring material to retain the same in fixed relation to said junction box upon withdrawal of said innermost ring member and said cover plate therethrough.

References Cited in the file of this patent

UNITED STATES PATENTS

| | | |
|---|---|---|
| Re. 17,290 | Ashley | May 7, 1929 |
| 1,069,180 | Reed | Aug. 5, 1913 |
| 1,893,268 | Boucher | Jan. 3, 1933 |
| 1,921,170 | Sharp | Aug. 8, 1933 |
| 2,063,569 | Walker | Dec. 8, 1936 |
| 2,094,523 | Bugbee | Sept. 28, 1937 |
| 2,431,082 | Sayles | Nov. 18, 1947 |
| 2,741,117 | Hoseason | Apr. 10, 1956 |